United States Patent [19]
Kazuma

[11] 3,871,499
[45] Mar. 18, 1975

[54] DEVICE FOR PREVENTING IMPROPER DISENGAGEMENT OF MULTIPLE-DISC CLUTCH

[75] Inventor: Adachi Kazuma, Yao, Japan

[73] Assignee: Kabushiki Kaisha Daikin Seisakusho, Neyagawa, Osaka, Japan

[22] Filed: Feb. 13, 1973

[21] Appl. No.: 332,145

[30] Foreign Application Priority Data
Feb. 14, 1972 Japan.............................. 47-15398

[52] U.S. Cl............................ 192/70.29, 192/70.18
[51] Int. Cl............................................ F16d 13/69
[58] Field of Search............ 192/70.18, 70.28, 70.29

[56] References Cited
UNITED STATES PATENTS
3,450,241    6/1969    Kuno ............................. 192/70.18

*Primary Examiner*—Benjamin W. Wyche
*Assistant Examiner*—Frank H. McKenzie, Jr.
*Attorney, Agent, or Firm*—Holman & Stern

[57] ABSTRACT

A device comprises a plate spring having one end fixed to the rear face of a pressure plate and the other end fixed to a clutch cover so as to urge the pressure plate toward the clutch disengaging direction and a guide member having one end in engagement with the plate spring and the other end in engagement with an intermediate plate to permit the intermediate plate to move to a neutral position following the movement of the pressure plate when the clutch is disengaged. The pressure plate and intermediate plate are forced out of engagement with the friction facings of clutch discs when the clutch is disengaged. The device further includes means for controlling the amount of movement of the intermediate plate.

8 Claims, 9 Drawing Figures

3,871,499

3,871,499

DEVICE FOR PREVENTING IMPROPER DISENGAGEMENT OF MULTIPLE-DISC CLUTCH

BACKGROUND OF THE INVENTION

This invention relates to a device for preventing improper disengagement of a multiple-disc clutch including at least two clutch discs.

With a multiple-disc clutch having a plurality of clutch discs between a flywheel and a pressure plate and an intermediate plate interposed between each two adjacent clutch discs, the torque transmitting ability of the clutch increases the number of the clutch discs increases, whereas it is difficult to effect complete separation between the friction facings of the clutch discs and the friction surfaces of the flywheel, intermediate plate and pressure plate when the clutch is operated for disengagement. Improper disengagement of the clutch will therefore result.

The multiple-disc clutch is suitable to meet the recent demand for clutches capable of withstanding a heavy load, but it is of great importance to eliminate improper disengagement when the clutch is disengaged.

SUMMARY OF THE INVENTION

A object of this invention is to completely prevent improper disengagement of a multiple-disc clutch of the type described.

Another object of this invention is to provide a device for preventing improper disengagement of the clutch which is simplified to the greatest possible extent.

The present invention provides a device incorporated in a multiple-disc clutch and comprising a plate spring and a guide member, the plate spring having one end fixed to the rear face of a pressure plate and the other end fixed to a clutch cover so as to urge the pressure plate toward the clutch disengaging direction, the guide member having one end in engagement with the plate spring and the other end in engagement with an intermediate plate to permit the intermediate plate to move to a neutral position following the movement of the pressure plate when the clutch is disengaged.

Thus according to this invention, the pressure plate and intermediate plate are forced toward the clutch disengaging direction and thereby completely disengaged from the friction facings of the clutch discs when the clutch is operated for disengagement.

The device of this invention further includes means for positively retaining the intermediate plate at the neutral position away from the friction facings of the clutch discs when the clutch is in its disengaged state.

According to the clutch of this invention, the friction facings are completely separated from the friction surfaces of the flywheel, intermediate plate and pressure plate when the clutch is disengaged to eliminate any causes which will lead to improper disengagement of the clutch and to thereby assure a smooth speed changing operation on the driven members. Consequently, the change gears are rendered free of damage, the clutch will not produce noises and the wear of the friction facings can be minimized to provide a clutch of high durability.

Other objects and features of this invention will become more apparent from the following description of embodiments.

DESCRIPTION OF THE PREFERRED EMBODIMENT

Figure 1:
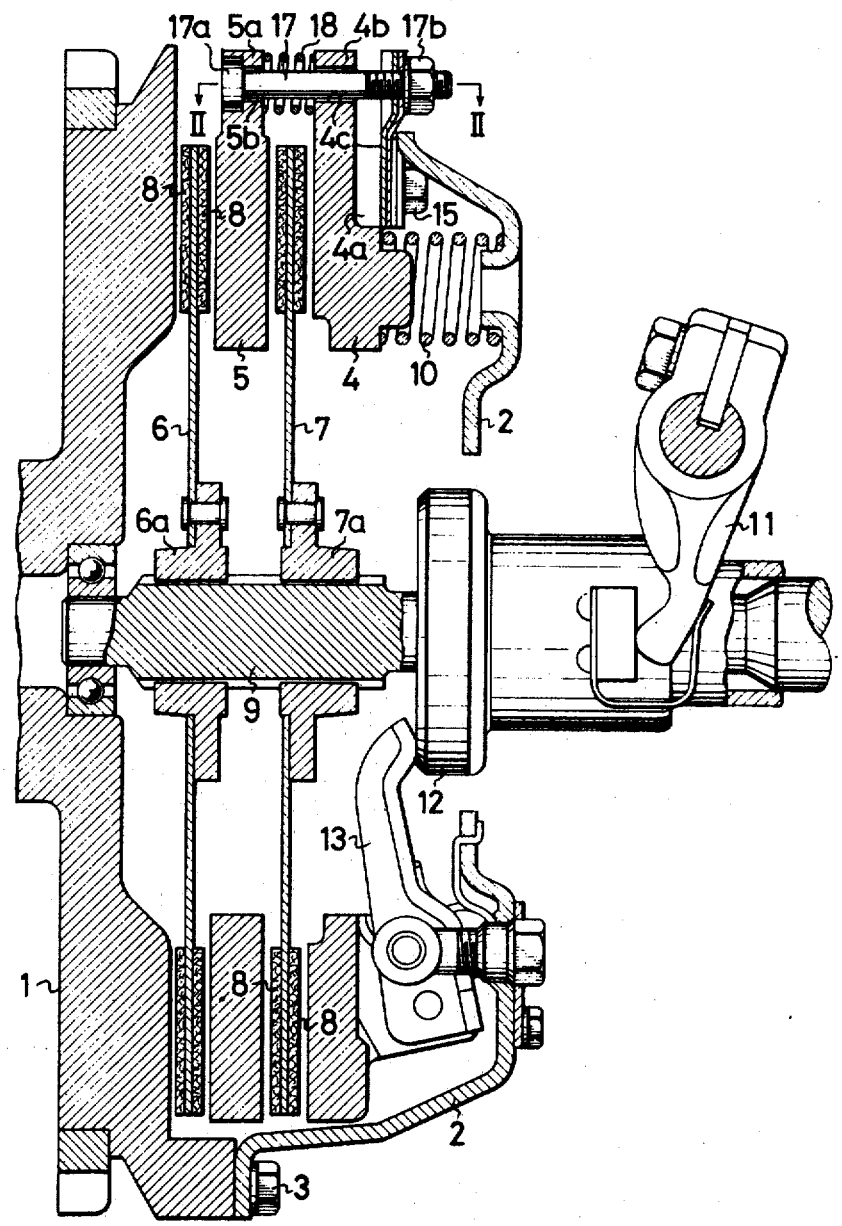
FIG. 1 is a view in vertical section taken along the line I—I in FIG. 2 and showing a multiple-disc clutch embodying this invention.
Figure 2:
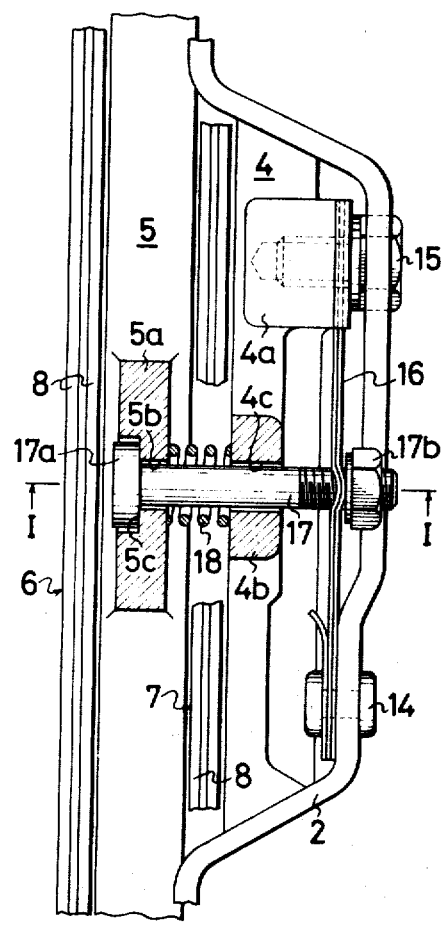
FIG. 2 is a plan view partly in section taken along the line II—II in FIG. 1 and showing the principal parts of the same.

Referring to FIGS. 1 and 2, a flywheel 1 is secured to an unillustrated shaft of a prime mover for rotation therewith. A clutch cover 2 is fixed to the flywheel 1 by a plurality of bolts 3.

Disposed within the clutch cover 2 are a pressure plate 4 and an intermediate plate 5 which are supported at unillustrated portions on the flywheel 1 or in the clutch cover 2 so as to be rotatable with the flywheel 1 and movable in the axial direction.

Clutch discs 6 and 7 carry friction facings 8 on their opposite side faces along the outer periphery thereof respectively. The facing 8 are positioned between the intermediate plate 5 and the pressure plate 4 respectively. Spline hubs 6a and 7a on the inner peripheries of the clutch discs 6 and 7 are splined to a main drive shaft 9 to be driven. Thus, the clutch discs 6 and 7 are rotatable with the shaft 9 and movable on the shaft 9 axially thereof.

Between the clutch cover 2 and pressure plate 4, there are disposed a plurality of coiled springs 10 along the circumferential direction although only one spring is shown. The pressure plate 4, intermediate plate 5, interposing clutch discs 6 and 7 are pressed against the flywheel 1 by a clutch engaging action for the transmission of torque to the main drive shaft 9.

As well known, the clutch is engaged and disengaged by operating a clutch pedal or the like. To disengage the clutch, for instance, a release yoke 11 is rotated in a clockwise direction to move a release bearing 12 leftward on the main drive shaft 9, causing the end face of the bearing 12 to push a release lever 13 in a counter-clockwise direction, whereby the pressure plate 4 is urged rightward against the action of the coiled springs 10. Thus the conventional clutch is so constructed that when freed from the pressure of the pressure plate 4, the clutch discs 6, 7 and intermediate plate 5 move rightward out of contact with the friction surfaces under the counteracting force of the driven members when the torque transmission is interrupted. To engage the clutch, a reverse operation causes the coiled springs 10 to move leftward the pressure plate 4 which in turn presses the clutch discs 6, 7 and intermediate plate 5 against the flywheel 1.

FIGS. 1 and 2 show the respective members when the clutch is in its disengaged state.

In the foregoing construction, there is provided a plate spring 16 having one end secured by a rivet 14 or the like to a suitable portion of the clutch cover 2 and the other end fixed by a bolt 15 or the like to a rear projection 4a of the pressure plate 4. Preferably, a plurality of the plate springs 16 may be used in layers as illustrated. The number of the plate springs is not particularly limited but only one plate can be used. The plate spring 16 is mounted in such manner that when the clutch is completely disengaged, its elastic force will be eliminated, whereas while the clutch is in its engaged state the plate spring will urge the pressure plate 4 in the clutch disengaging direction, namely in the rightward direction, the plate spring 16 further being such that it will not prevent the coiled springs 10 from biasing the pressure plate 4.

The plate spring 16 is in the form, for example, of a T-shaped, triangular or like sheet and is formed at its opposite ends with holes 16a and 16b for passing the rivet 14 and bolt 15.

The plate spring 16 has a hole 16c for passing a guide member 17 at its approximate center, namely in the vicinity of the top of the T-shape or triangle. The pressure plate 4 and intermediate plate 5 are formed at their outer peripheries with projections 4b and 5a, respectively, which have holes 4c and 5b for passing the guide member 17.

In the case of the illustrated embodiment, the guide member 17 comprises a headed bolt and a nut. The head 17a of the guide member 17 engages in a stepped portion 5c of the hole 5b in the intermediate plate 5, with the stem of the bolt extending through the holes 5b 4c and 16c. The nut indicated at 17b fits around the threaded portion of the bolt, in engagement with the spring 16.

Interposed between the intermediate plate 5 and the pressure plate 4 is a coiled spring 18 which acts to expand the space between the intermediate plate 5 and pressure plate 4.

Figure 5:
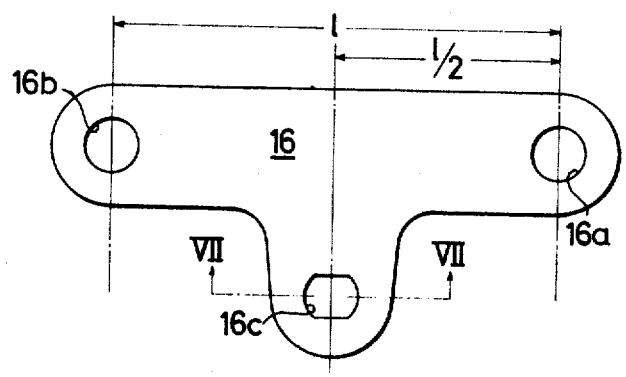
FIG. 5 is a front view showing an embodiment of plate spring having ends to be secured to a pressure plate and a clutch cover respectively.

In the case of the illustrated embodiment including one intermediate plate 5 with the clutch discs 6 and 7 positioned at the opposite sedes of the intermediate plate, the holes 16a, 16b and 16c in the plate spring 16 are so disposed that if the distance between the holes 16a and 16b is the hole 16c is located approximately at the middle of the distance, namely at a position l/2 from the holes 16c and 16b as seen in FIG. 5, because during the engagement and disengagement of the clutch the plate spring 16 undergoes plastic deformation about the rivet 14, namely about the hole 16a, while the amount of movement of the intermediate plate 5 is about ½ of that of the pressure plate 4. In the case of a multiple-disc clutch comprising two intermediate plates 5 and three clutch discs, it is necessary to provide two guide members 17 and to form holes 16c in the plate spring 16 at spacing of l/3.

Thus by a clutch disengaging operation, the pressure plate 4 is moved rightward and, at the same time the intermediate plate 5 is forced rightward by ½ the amount of rightward movement of the pressure plate 4 by means of the plate spring 16 and guide member 17 to completely disengage the clutch. Improper disengagement of the clutch is therefore precluded. At this time, the coiled spring 18 serves to prevent the intermediate plate 5 from excessive rightward movement. Upon a clutch engaging operation, coiled springs 10 act to urge the pressure plate 4 leftward to press the clutch discs 6 and 7 and intermediate plate 5 against the flywheel 1 to transmit the torque. The elastic force of the coiled springs 10 is set at a level sufficiently greater than the sum of the forces of the coiled spring 16 and a spring acting on the release lever 13.

Figure 3:
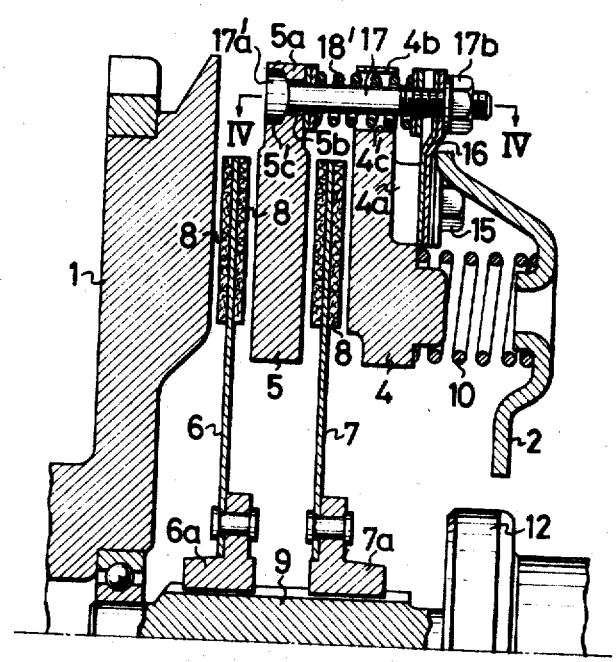
FIG. 3 is a view in vertical section taken along the line III—III in FIG. 4 and showing another embodiment of this invention.
Figure 4:
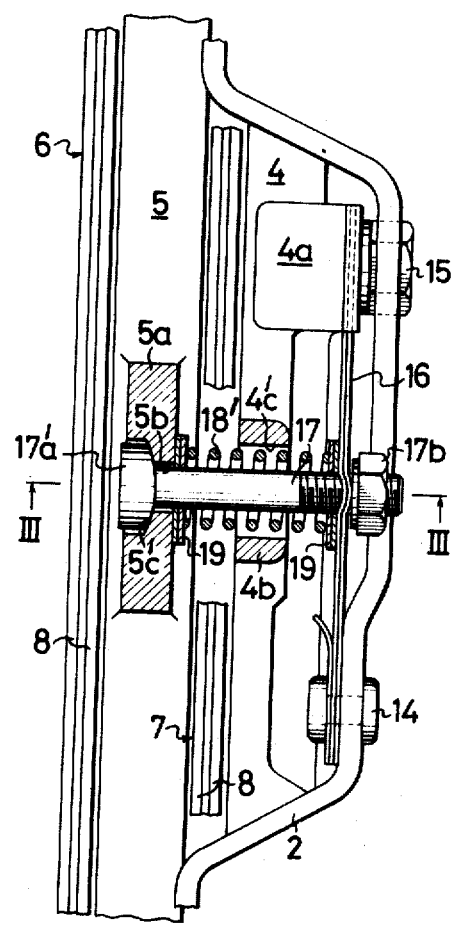
FIG. 4 is a plan view partly in vertical section taken along the line IV—IV in FIG. 3 and showing the principal parts of the same.

FIGS. 3 and 4 show an embodiment in which a coiled spring 18' for determining the position of the intermediate plate 5 when the clutch is disengaged is provided between the intermediate plate 5 and the plate spring 16. The parts similar to those in FIGS. 1 and 2 are designated by the same reference numerals.

A hole 4c' formed in the projection 4b on the outer periphery of the pressure plate 4 for passing the guide member has an increased diameter so as to receive the coiled spring 18' along with the guide member.

Provided at the opposite bearing ends of the coiled spring 18' are a plurality of shims 19 whose number can be increased or decreased to adjust the active force of the coiled spring 18'.

The head 17a' of the guide member 17 is formed with a spherical or circular arc face to be engaged with a stepped portion 5c', whereby the guide member is adapted to follow the displacement of the intermediate plate 5 and pressure plate 4 in the rotational direction.

Figure 6:
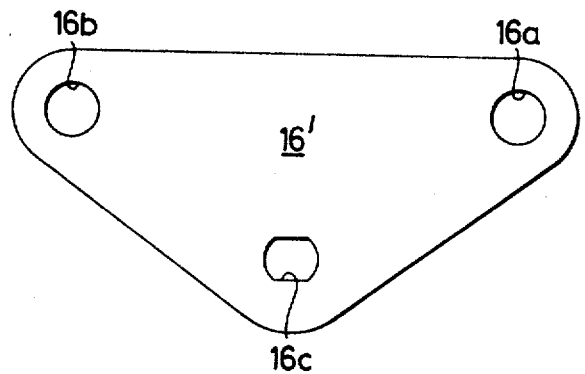
FIG. 6 is a front view showing another embodiment of the plate spring.

The plate spring 16 may be T-shaped as shown in FIG. 5, or may be in the form of a triangle 16' as shown in FIG. 6. It may be of another suitable shape.

Figure 7:
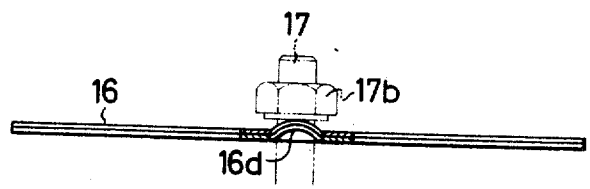
FIG. 7 is a view partly in section taken along the line VII—VII in FIG. 5 and showing the shape of the plate spring.
Figure 8:
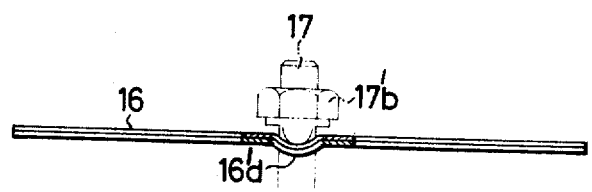
FIGS. 8 and 9 are views corresponding to FIG. 7 and showing modified embodiments of the plate spring.

The portion of the plate spring 16 to be engaged with the nut 17b on the guide member 17 may be in the form of a projection 16d curved out toward the bottom of the nut 17b as shown in FIG. 7 or may be in the form of a curved recess 16d' in which a projecting portion of a nut 17b' engages as shown in FIG. 8. Such construction serves to absorb impact upon disengagement of the clutch and enhances freedom with respect to the deflection of the guide member 17 in the rotational direction. The construction of FIG. 8 further serves to determine the position of engagement.

Figure 9:
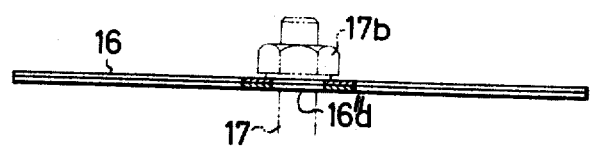

The engaging portion of the plate spring may be planar as indicated at 16d'' in FIG. 9.

What is claimed is:

1. A multiple-disc clutch comprising a plurality of clutch discs having friction facings between a flywheel and a pressure plate, an intermediate plate interposed between the friction facings of the clutch discs and rotatable with the flywheel and the pressure plate, a plate spring having one end secured to a clutch cover connected to the flywheel and the other end secured to the pressure plate and a guide member having one end in engagement with an intermediate portion of the length of the plate spring and the other end in engagement with the intermediate plate, the guide member forcing the intermediate plate to follow the movement of the pressure plate for movement at a definite ratio relative to the movement of the pressure plate when the clutch is operated for disengagement.

2. The clutch as set forth in claim 1 wherein the plate spring comprises a laminated plate spring composed of at least two springs.

3. The clutch as set forth in claim 1 wherein the guide member comprises a headed bolt and a nut in screwthread engagement with the bolt.

4. The clutch as set forth in claim 1 wherein a coiled spring is disposed between the intermediate plate and the pressure plate to determine the position of the intermediate plate when the clutch is disengaged.

5. The clutch as set forth in claim 1 wherein a coiled spring is disposed between the intermediate plate and the plate spring to determine the position of the intermediate plate when the clutch is disengaged.

6. The clutch as set forth in claim 1 wherein the plate spring is formed with a curved projection for engagement with the guide member and the top of the projection engages with the engaging portion of the guide member.

7. The clutch as set forth in claim 1 wherein the plate spring is formed with a curved recess for engagement with the guide member and a projection on the engaging face of the guide member engages in the inner bottom of the recess.

8. The clutch as set forth in claim 1 wherein the guide member has a spherical or circular arc face for engagement with the intermediate plate.

* * * * *